(12) United States Patent  
Ghiotto

(10) Patent No.: US 6,731,036 B2  
(45) Date of Patent: May 4, 2004

(54) ELECTRIC MOTOR WITH IMPROVED FRAME COOLED BY AN AIR FLOW

(75) Inventor: Giorgio Ghiotto, Perarolo di Arcugnano (IT)

(73) Assignee: E.M.G. Elettromeccanica S.R.L., Gambugliano (IT)

( * ) Notice: Subject to any disclaimer, the term of this patent is extended or adjusted under 35 U.S.C. 154(b) by 0 days.

(21) Appl. No.: 10/386,602

(22) Filed: Mar. 13, 2003

(65) Prior Publication Data

US 2003/0184172 A1 Oct. 2, 2003

(30) Foreign Application Priority Data

Mar. 28, 2002 (IT) ..................................... VI2002A0056  
Jun. 24, 2002 (IT) ..................................... MI2002A1385

(51) Int. Cl.[7] .............................................. H02K 5/02
(52) U.S. Cl. ........................ 310/89; 310/67 R; 310/58
(58) Field of Search .......................... 310/89, 58, 59, 310/62, 63, 71

(56) References Cited

U.S. PATENT DOCUMENTS

| | | | | | |
|---|---|---|---|---|---|
| 1,586,390 | A | * | 5/1926 | Steinhart | 310/89 |
| 3,610,975 | A | * | 10/1971 | Onjanow | 310/57 |
| 3,707,638 | A | * | 12/1972 | Nailen | 310/152 |
| 4,135,171 | A | * | 1/1979 | Violet | 366/60 |
| 4,668,898 | A | * | 5/1987 | Harms et al. | 318/254 |
| 4,742,257 | A | * | 5/1988 | Carpenter | 310/62 |
| 4,811,820 | A | * | 3/1989 | Rossi | 188/71.6 |
| 4,853,570 | A | * | 8/1989 | Isozumi et al. | 310/78 |
| 4,858,303 | A | * | 8/1989 | Fisher | 29/596 |
| 4,963,778 | A | * | 10/1990 | Jensen et al. | 310/68 D |
| 5,006,744 | A | * | 4/1991 | Archer et al. | 310/89 |
| 5,081,384 | A | * | 1/1992 | Rausch | 310/63 |
| 5,714,816 | A | * | 2/1998 | Jensen et al. | 310/89 |
| 5,780,946 | A | * | 7/1998 | Nakamura et al. | 310/58 |

FOREIGN PATENT DOCUMENTS

| | | |
|---|---|---|
| DE | 195 27 879 | 1/1997 |
| EP | 0 825 703 | 2/1998 |
| JP | 60-141148 | 7/1985 |
| WO | 95/06971 | 3/1995 |

\* cited by examiner

Primary Examiner—Dang Le  
(74) Attorney, Agent, or Firm—Jacobson Holman PLLC

(57) ABSTRACT

The invention relates to an air-cooled electric motor with a substantially cylindrical frame, closed by a front bottom and a rear bottom carrying bearings thereon for support of the drive shaft. The rear bottom extends in a peripheral wall projecting outwardly away from the frame wall and in substantial alignment therewith, to the free edge of said peripheral wall a cover being applied to delimit a chamber adapted to receive electric elements complementary to the motor.

13 Claims, 4 Drawing Sheets

ELECTRIC MOTOR WITH IMPROVED FRAME COOLED BY AN AIR FLOW

BACKGROUND OF THE INVENTION

The present invention relates to electric motors, in particular motors provided with a frame-cooling system at its generally finned outer wall.

Such motors are equipped with complementary electric components, such as terminal board for connection to the power supply, starting capacitor, possible switches or protection devices against overcurrents and the like.

In a traditional configuration, a box-shaped seat is applied to the outside of the frame; said seat radially projects from the frame and one or more of the above components are housed therein, depending on requirements.

The radial projection of this box-shaped seat gives rise to many drawbacks when the motor is to be mounted within limited spaces, also because it constrains the angular positioning of the motor that loses its axial symmetry, i.e. its generally cylindrical configuration. In addition, in forming the frame a base is to be provided for positioning and anchoring of the box-shaped seat, which will bring about complications in the configuration of the forming moulds and, above all, will make it impossible to position the projecting box in a manner different from the foreseen one, when said box hinders positioning of the motor in the apparatus where said motor is required.

It is an aim of the invention to obviate the above drawbacks by providing an electric motor with forced air cooling, in the frame of which a housing for complementary electric components is formed without the radial overall dimensions of the motor being altered. It is a further aim of the invention to house such components in a still more protected manner than allowed by many known embodiments.

SUMMARY OF THE INVENTION

For the purpose, in accordance with the invention the electric motor has the features recited in claim 1.

BRIEF DESCRIPTION OF THE DRAWINGS

For better explaining the essential features of a motor in accordance with the invention and the advantages it offers, exemplary embodiments will be described hereinafter with the aid of the accompanying drawings. In the drawings.

DETAILED DESCRIPTION OF THE INVENTION

Figure 1:
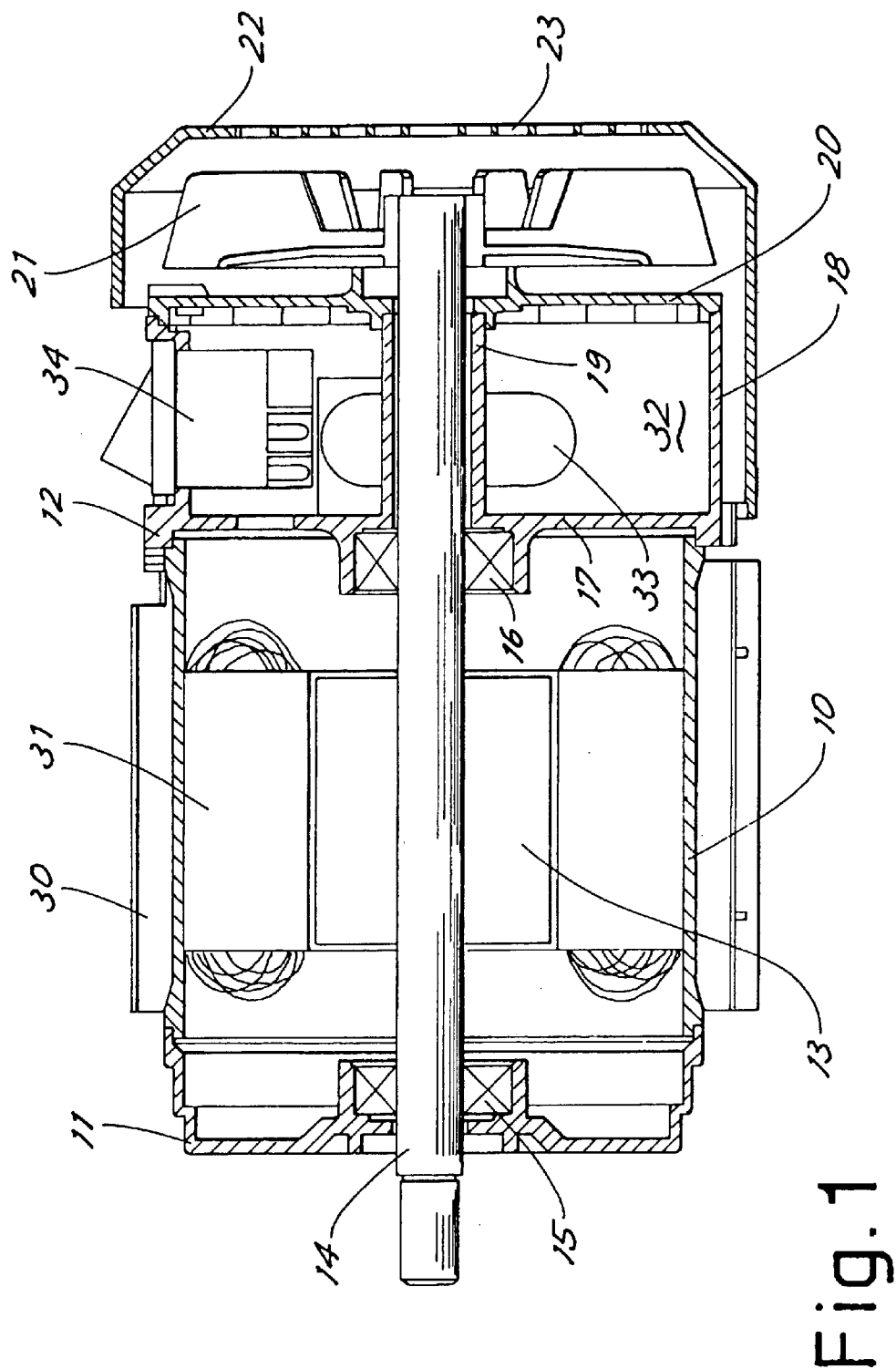
FIG. 1 shows a diagrammatic view in partial longitudinal section of a motor in accordance with the invention.
Figure 2:
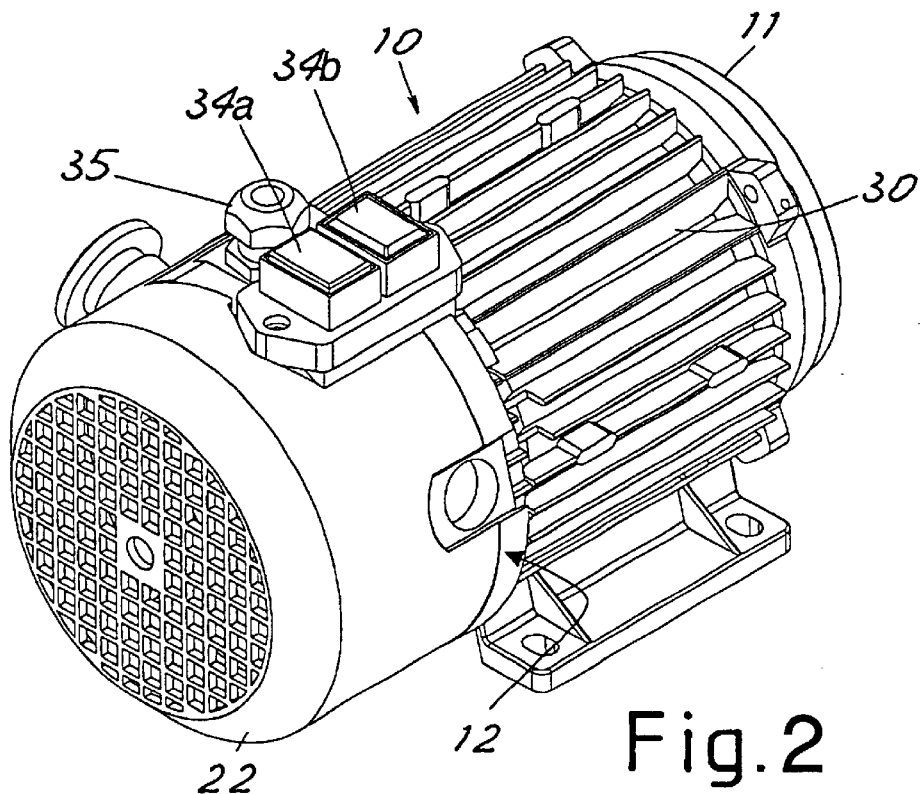
FIG. 2 is an overall axonometric view of an alternative embodiment of the device of the invention.

With reference to the drawings, as clearly seen in FIGS. 1 and 2, the motor comprises a frame 10 of generally cylindrical shape. One end of frame 10 is closed by a front bottom 11, the other end by a rear bottom 12. These bottoms are fastened to the frame ends in known manner, by screws for example.

The outer wall of frame 10 is preferably externally provided with longitudinal fins 30 to increase heat dissipation. Mounted within the frame, as traditional, is the motor stator, of any known type and configuration, partly diagrammatically shown at 31.

The motor comprises rotor 13, the shaft 14 of which is supported by bearings 15 and 16 mounted on bottoms 11 and 12, respectively.

Coming out of bottom 11, of any traditional configuration, there is the end of shaft 14 designed to be connected to any device driven by the motor, through an appropriate mechanical coupling.

The configuration of bottom 12 is, on the contrary, critical for achievement of the aims of the invention. It comprises a transverse wall 17 for closure of the frame, which wall receives the bearing 16 and a circumferential wall 18 jutting out away from the frame and substantially constituting an extension of the frame wall.

The transverse wall 17 is passed through by the end of shaft 14, and a sleeve 19 also jutting out from said transverse wall surrounds shaft 14 without contacting it.

The generally cylindrical wall 18 together with sleeve 19 identify an annular chamber or space 32 closed by a cover 20 also passed through contactless by shaft 14.

A cooling fan 21 is fastened to the end of shaft 14 coming out of cover 20, said fan being covered by a cap 22. The central portion 23 of this cap is provided with openings for passage of the air sucked by fan 21. The air is peripherally ejected through the annular opening formed between the cap and the substantially continuous wall consisting of frame 10 and the wall 18 of bottom 12.

It is apparent that the motor in this way is provided with a completely closed annular chamber 32 in which the required complementary elements for motor equipment can be inserted, the overall dimensions of which are diagrammatically denoted at 33.

In wall 18 windows can be formed on which complementary elements susceptible of being accessible or operated from the outside are mounted, a bushing for passage of the power cord or a switch connected to the conductors for powering the motor, for example. Obviously, corresponding openings are formed in cap 22. By way of example, a switch housed in a corresponding opening of wall 18 is diagrammatically shown at 34 in FIG. 1 and two switches 34a and 34b are shown in FIG. 2.

Openings can also be provided, possibly closed by flexible waterproof baffles, when elements to be manually operated from the outside are wished to be mounted in the chamber, such as commands for protection reset, switches or the like that are mounted within chamber 32. If necessary cap 22 too will be provided with passage openings, as can be clearly seen in the different figures.

Obviously, the longitudinal sizes of the chamber are defined by the overall volume and overall dimensions of the elements to be received therein, measurement of which can be easily established through definition of the length of wall 18 and sleeve 19 in the axial direction of the motor.

The motor in accordance with the invention appears to have the minimum radial dimensions required by the motor itself, thereby facilitating mounting of same in sacrificed positions. The complementary elements, in addition to being received without taking too much room in a radial direction, are also enclosed in a well protected housing, even watertight against accidental projections of liquid splashes.

Figure 3:
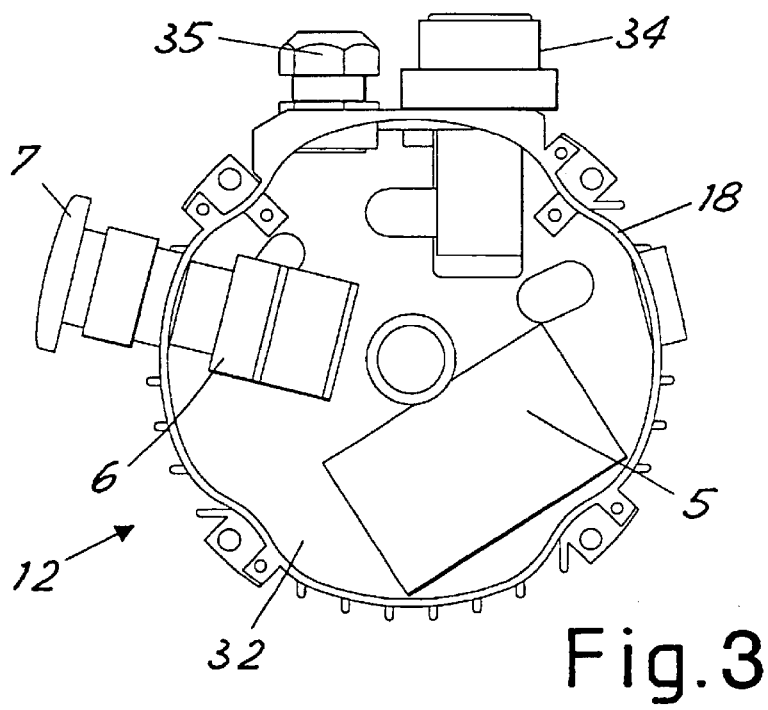
FIGS. 3 and 4 show a front view and an axonometric view respectively of an element of the device of the invention.
Figure 4:
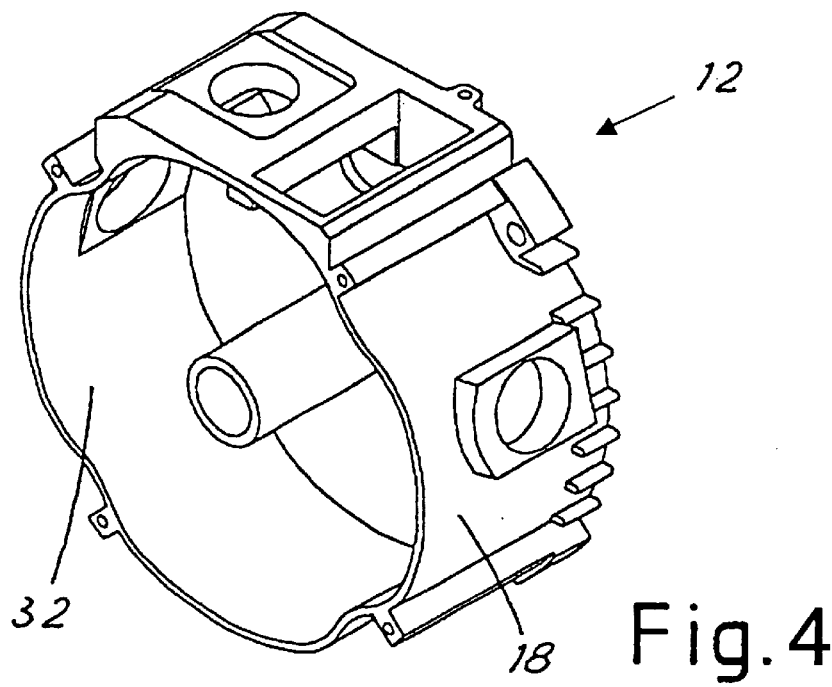

In the embodiment shown in FIGS. 2, 3 and 4, in space 32 a housing can be provided for the starting capacitor 5, the release coil 6 operable by an emergency key 7, and also a significant portion of the on-off keys 34. Access to the inside of space 32 takes place by a fairlead 35 of known type.

Figure 5:
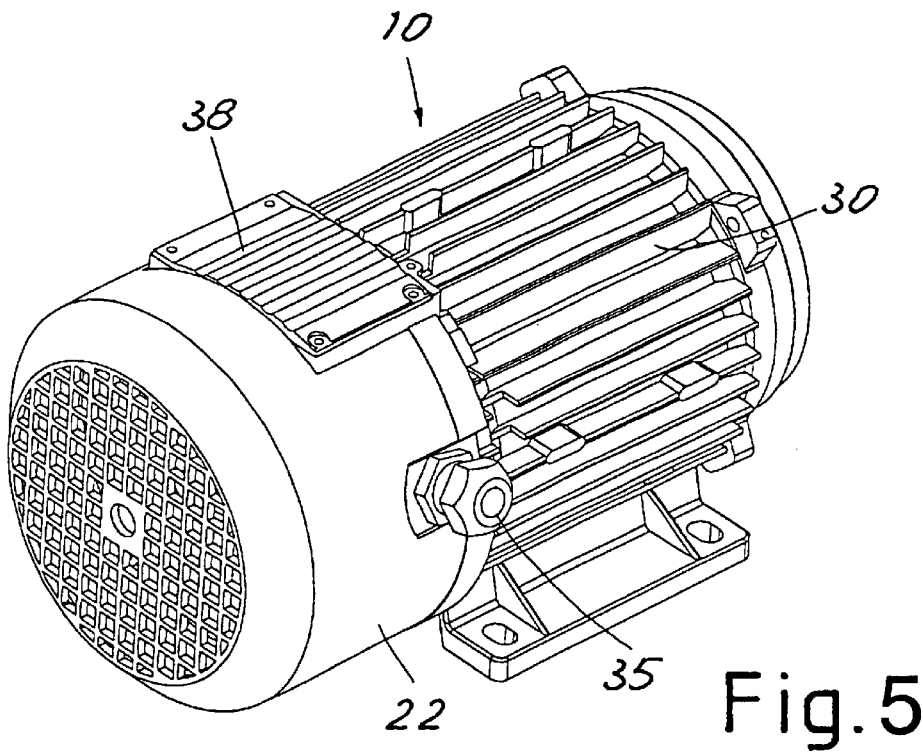
FIG. 5 shows an axonometric view of a second alternative embodiment of the device of the invention.
Figure 6:
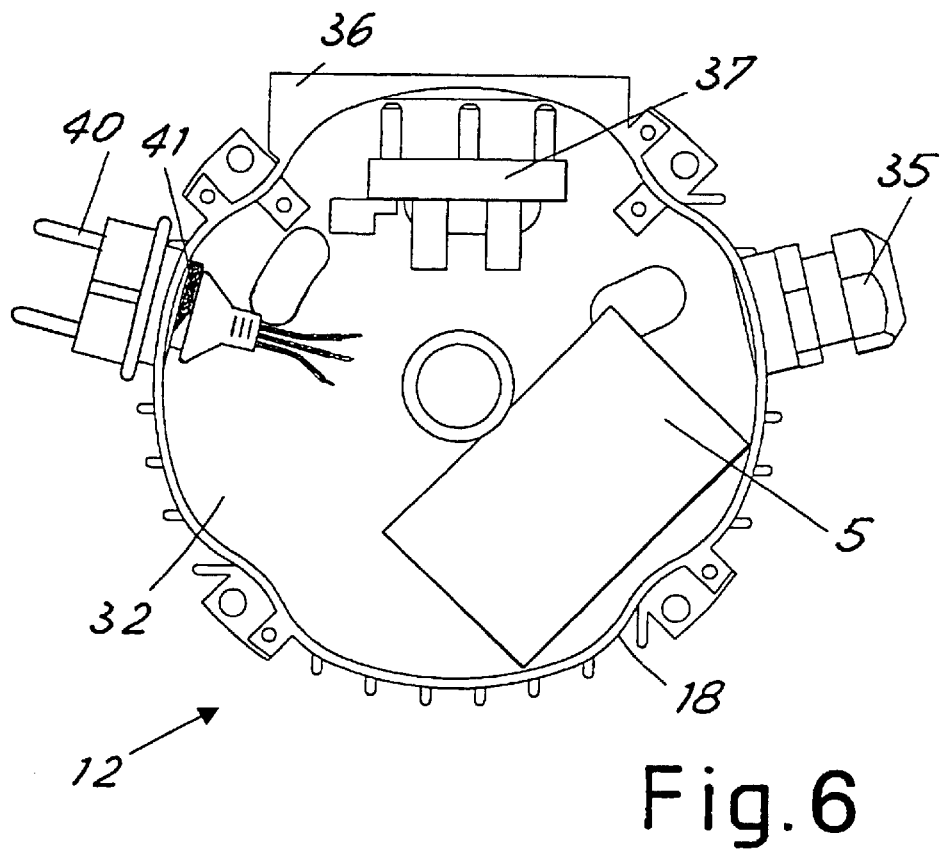
FIGS. 6 and 7 show a front view and an axonometric view respectively of an element of the alternative embodiment in FIG. 5.
Figure 7:
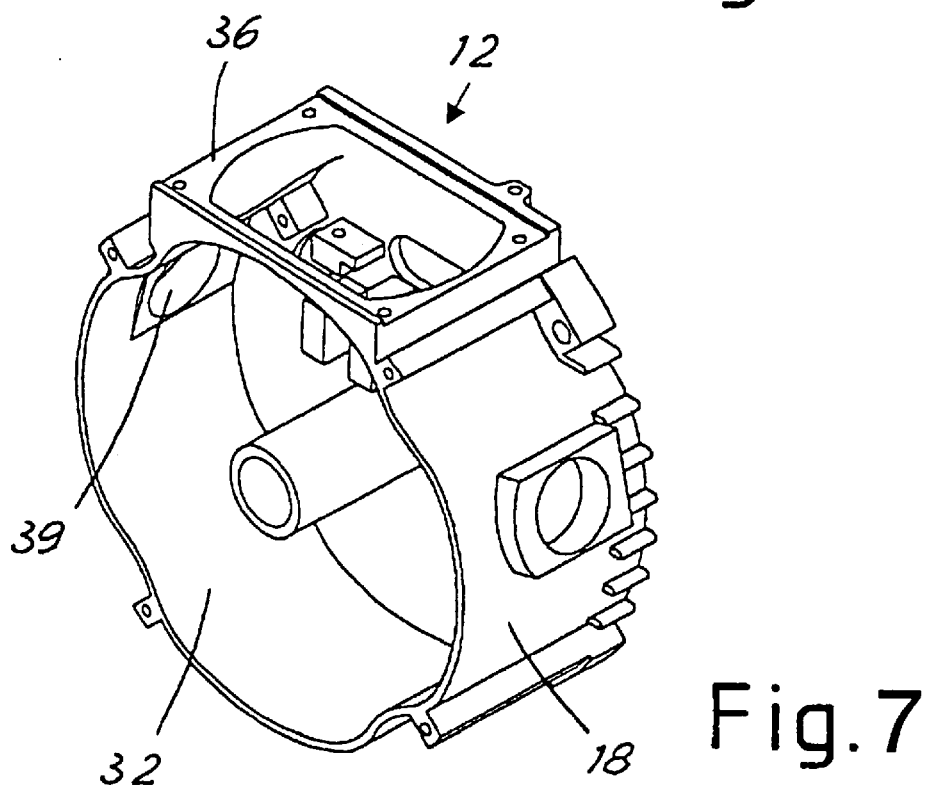

In FIGS. 5, 6 and 7 it is shown another particular embodiment of the invention in which a terminal board 37 is used which is placed within space 32. In this case a box-shaped seat 36 is formed at a lateral portion, said seat including a closing cover 38 which is advantageously hermetically sealed and opening of which obviously enables access to the terminals of the terminal board 37. In this case as well at least one fairlead 35 is envisaged for access to the inside of the chamber.

Advantageously, a hole 39 is advantageously also present on wall 18 to enable passage of an electric plug 40 held in place by a fork 41 located close to the inner surface of said hole.

What is claimed is:

1. An air-cooled electric motor comprising a frame having a substantially cylindrical wall closed by a front bottom and a rear bottom carrying bearings thereon for support of a drive shaft passing through the bottoms, a shaft end passing through the rear bottom carrying a fan blower starting a cooling-air flow tangentially of the outer frame wall, the rear bottom extending in a peripheral wall jutting out outwardly away from the frame wall and in substantial alignment therewith, to a free edge of said peripheral wall being applied a cover passed through by the shaft emerging from the cover at the shaft end carrying the fan blower, said peripheral wall and cover delimiting a chamber adapted to receive electric elements complementary to the motor.

2. The electric motor as claimed in claim 1, wherein a sleeve is provided on said rear bottom, the sleeve is disposed in concentric relationship with said peripheral wall surrounding the shaft portion passing through said chamber, without contacting it.

3. The electric motor as claimed in claim 1, wherein at the rear bottom a cup-shaped cap is mounted a perforated circular wall of which faces the cover, the fan blower being interposed therebetween, and the cylindrical wall faces the peripheral wall of the rear bottom to define an annular duct for the air pushed by the fan blower, which duct is directed tangentially of the frame.

4. The electric motor as claimed in claim 1, wherein the outer frame wall carries fins mainly oriented in a direction of the generatrices thereof.

5. The electric motor as claimed in claim 1, wherein at least one radial passage is provided in said peripheral wall of the rear bottom for access to said chamber.

6. The electric motor as claimed in claim 5, wherein in at least one of the radial passages a component requiring operation from the outside is mounted.

7. The electric motor as claimed in claim 5, wherein the cylindrical wall of the cap has discontinuities at the radial passage in the peripheral wall.

8. The electric motor as claimed in claim 1, wherein at least one fairlead present on the peripheral wall penetrates into the chamber.

9. The electric motor as claimed in claim 1, wherein a starting capacitor is housed within the chamber.

10. The electric motor as claimed in claim 1, wherein on the peripheral wall there is present a seat of a key for an emergency stop acting on a release coil arranged within the chamber.

11. The electric motor as claimed in claim 1, wherein on the peripheral wall a seat for on-off buttons is present.

12. The electric motor as claimed in claim 1, wherein within the chamber, provision is made for a terminal board arranged within a box-shaped seat formed at a peripheral portion, said box-shaped seat being closed, under normal operating conditions of the motor, by a cover that can be opened.

13. The electric motor as claimed in claim 1, wherein a hole is present on the side wall to enable passage of an electric plug held in place by a fork located close to the inner surface of said hole.

* * * * *